(12) United States Patent
Yano

(10) Patent No.: US 9,563,347 B2
(45) Date of Patent: Feb. 7, 2017

(54) DEVICE, METHOD, AND STORAGE MEDIUM STORING PROGRAM

(71) Applicant: KYOCERA CORPORATION, Kyoto-shi, Kyoto (JP)

(72) Inventor: Junya Yano, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 121 days.

(21) Appl. No.: 13/850,707

(22) Filed: Mar. 26, 2013

(65) Prior Publication Data

US 2013/0249843 A1    Sep. 26, 2013

(30) Foreign Application Priority Data

Mar. 26, 2012 (JP) ................................ 2012-070147

(51) Int. Cl.
*G06F 3/0488* (2013.01)
*H04M 1/67* (2006.01)
*H04M 1/725* (2006.01)

(52) U.S. Cl.
CPC ......... *G06F 3/0488* (2013.01); *G06F 3/04883* (2013.01); *H04M 1/67* (2013.01); *H04M 1/72583* (2013.01)

(58) Field of Classification Search
CPC .................................................. G06F 3/0488
USPC ..................... 345/173–178; 178/18.01–20.01
See application file for complete search history.

(56) References Cited

U.S. PATENT DOCUMENTS

| | | | |
|---|---|---|---|
| 2008/0059893 A1* | 3/2008 | Byrne | G06F 3/0481 715/757 |
| 2008/0165160 A1 | 7/2008 | Kocienda et al. | |
| 2010/0001967 A1* | 1/2010 | Yoo | G06F 3/0488 345/173 |
| 2010/0146384 A1* | 6/2010 | Peev | H04M 1/673 715/255 |
| 2010/0269040 A1 | 10/2010 | Lee | |
| 2011/0028186 A1* | 2/2011 | Lee | G06F 3/0486 455/566 |
| 2011/0252357 A1* | 10/2011 | Chaudhri | G06F 3/04883 715/780 |
| 2012/0046077 A1* | 2/2012 | Kim | H04M 1/72577 455/566 |
| 2012/0129496 A1* | 5/2012 | Park | G06F 3/0488 455/411 |
| 2012/0131501 A1* | 5/2012 | Lazaridis | G06F 3/0488 715/804 |
| 2012/0284673 A1* | 11/2012 | Lamb | G06F 3/04883 715/863 |

FOREIGN PATENT DOCUMENTS

WO    2008086302 A1    7/2008

OTHER PUBLICATIONS

Office Action mailed Jun. 9, 2015, corresponding to Japanese patent application No. 2012-070147.

\* cited by examiner

*Primary Examiner* — Chad Dicke
(74) *Attorney, Agent, or Firm* — Hauptman Ham, LLP

(57) ABSTRACT

According to an aspect, a device includes a touch screen display and a controller. The touch screen display displays a lock screen in a locked state. The controller causes the touch screen display to display an activated icon corresponding to an activated function on the lock screen.

8 Claims, 14 Drawing Sheets

DEVICE, METHOD, AND STORAGE MEDIUM STORING PROGRAM

CROSS-REFERENCE TO RELATED APPLICATIONS

This application claims priority from Japanese Application No. 2012-070147, filed on Mar. 26, 2012, the content of which is incorporated by reference herein in its entirety.

BACKGROUND

1. Technical Field

The present application relates to a device, a method, and a storage medium storing therein a program. More particularly, the present application relates to a device including a touch screen, a method of controlling the device, and a storage medium storing therein a program for controlling the device.

2. Description of the Related Art

A touch screen device having a touch screen has been known. Examples of the touch screen devices include, but are not limited to, a smartphone and a tablet. The touch screen device detects a gesture of a finger, a pen, or a stylus pen through the touch screen. Then, the touch screen device operates according to the detected gesture. An example of the operation according to the detected gesture is described in, for example, International Publication Pamphlet No. 2008/086302.

The basic operation of the touch screen device is implemented by an operating system (OS) built into the device. Examples of the OS built into the touch screen device include, but are not limited to, Android, BlackBerry OS, iOS, Symbian OS, and Windows Phone.

Most of touch screen devices move to a locked state when a period during which no operation is performed by a user continues for a certain period of time. The touch screen device does not accept the user's operation in the locked state except for a specific operation. The specific operation is, for example, an unlock operation for releasing a locked state.

The touch screen device frequently moves to the locked state. Therefore, a lock screen is frequently displayed by the user. For the foregoing reasons, there is a need for a device, a method, and a program capable of improving operability of the lock screen.

SUMMARY

According to an aspect, a device includes a touch screen display and a controller. The touch screen display displays a lock screen in a locked state. The controller causes the touch screen display to display an activated icon corresponding to an activated function on the lock screen.

According to another aspect, a method is for controlling a device including a touch screen display. The method includes: displaying a lock screen indicating a locked state on the touch screen display; and displaying an activated icon corresponding to an activated function on the lock screen.

According to another aspect, a non-transitory storage medium stores a control program. When executed by a device including a touch screen display, the program causes the device to execute: displaying a lock screen indicating a locked state on the touch screen display; and displaying an activated icon corresponding to an activated function on the lock screen.

DETAILED DESCRIPTION

Exemplary embodiments of the present invention will be explained in detail below with reference to the accompanying drawings. A smartphone will be explained below as an example of a device provided with a touch screen.

Figure 1:
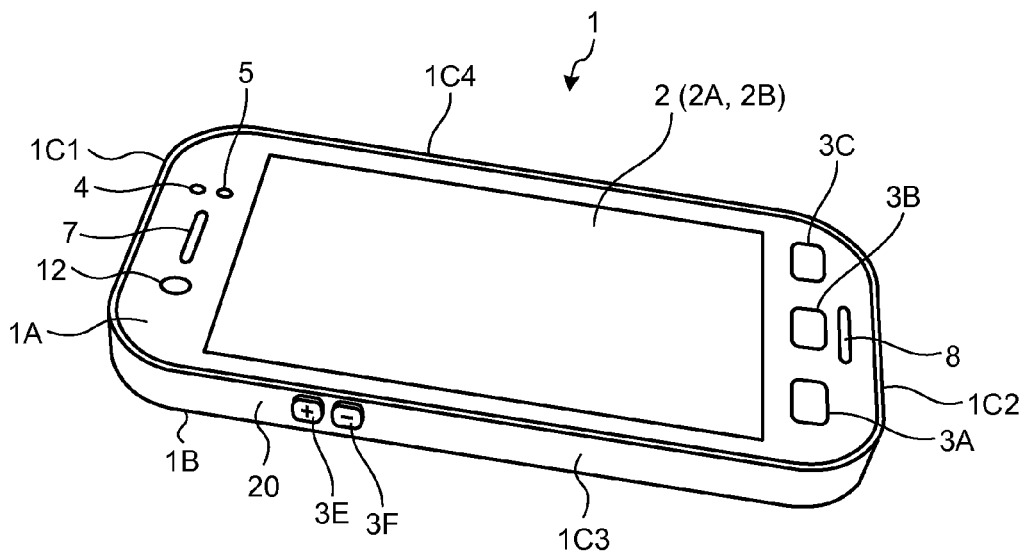
FIG. 1 is a perspective view of a smartphone according to an embodiment.
Figure 2:
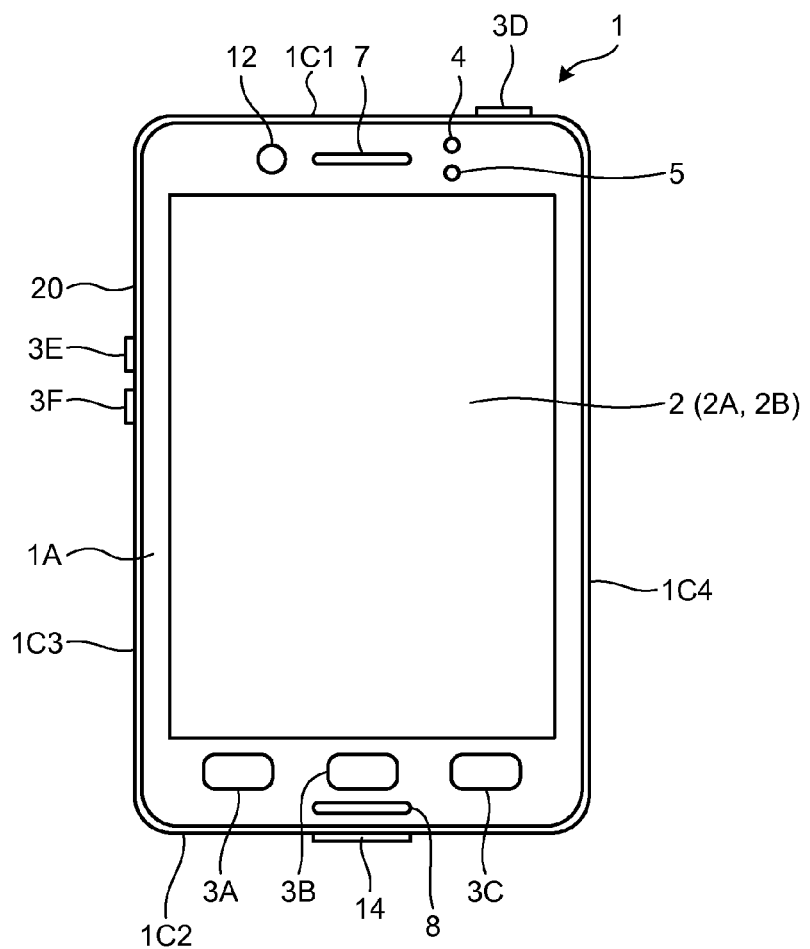
FIG. 2 is a front view of the smartphone.
Figure 3:
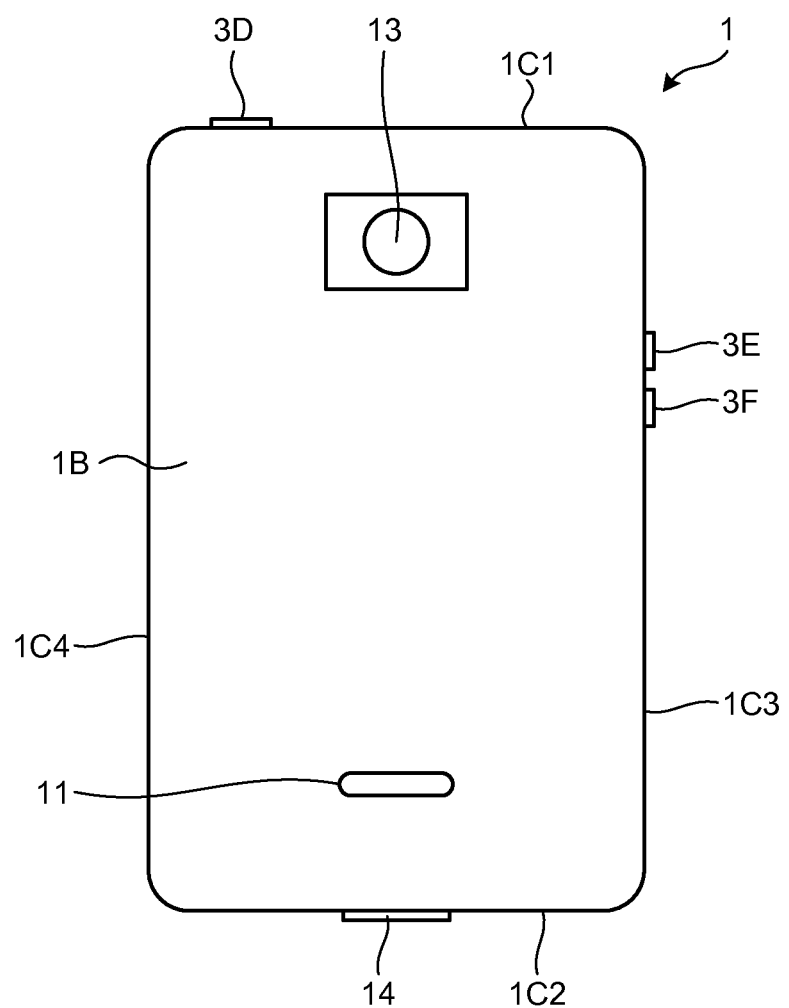
FIG. 3 is a back view of the smartphone.

An overall configuration of a smartphone 1 according to an embodiment will be explained below with reference to FIG. 1 to FIG. 3. As illustrated in FIG. 1 to FIG. 3, the smartphone 1 includes a housing 20. The housing 20 includes a front face 1A, a back face 1B, and side faces 1C1 to 1C4. The front face 1A is a front of the housing 20. The back face 1B is a back of the housing 20. The side faces 1C1 to 1C4 are sides each connecting the front face 1A and the back face 1B. Hereinafter, the side faces 1C1 to 1C4 may be collectively called "side face 1C" without being specific to any of the side faces.

The smartphone 1 includes a touch screen display 2, buttons 3A to 3C, an illumination (ambient light) sensor 4, a proximity sensor 5, a receiver 7, a microphone 8, and a camera 12, which are provided in the front face 1A. The smartphone 1 includes a speaker 11 and a camera 13, which are provided in the back face 1B. The smartphone 1 includes buttons 3D to 3F and a connector 14, which are provided in the side face 1C. Hereinafter, the buttons 3A to 3F may be collectively called "button 3" without being specific to any of the buttons.

The touch screen display 2 includes a display 2A and a touch screen 2B. In the example of FIG. 1, each of the display 2A and the touch screen 2B is approximately rectangular-shaped; however, the shapes of the display 2A and the touch screen 2B are not limited thereto. Each of the display 2A and the touch screen 2B may have any shape such as a square, a circle or the like. In the example of FIG. 1, the display 2A and the touch screen 2B are arranged in a superimposed manner; however, the manner in which the display 2A and the touch screen 2B are arranged is not limited thereto. The display 2A and the touch screen 2B may be arranged, for example, side by side or apart from each other. In the example of FIG. 1, longer sides of the display 2A are along with longer sides of the touch screen 2B respectively while shorter sides of the display 2A are along with shorter sides of the touch screen 2B respectively; however, the manner in which the display 2A and the touch screen 2B are superimposed is not limited thereto. In case the display 2A and the touch screen 2B are arranged in the superimposed manner, they can be arranged such that, for example, one or more sides of the display 2A are not along with any sides of the touch screen 2B.

The display 2A is provided with a display device such as a liquid crystal display (LCD), an organic electroluminescence display (OELD), or an inorganic electroluminescence display (IELD). The display 2A displays text, images, symbols, graphics, and the like.

The touch screen 2B detects a contact of a finger, a pen, a stylus pen, or the like on the touch screen 2B. The touch screen 2B can detect positions where a plurality of fingers, pens, stylus pens, or the like make contact with the touch screen 2B.

The detection method of the touch screen 2B may be any detection methods, including but not limited to, a capacitive type detection method, a resistive type detection method, a surface acoustic wave type (or ultrasonic type) detection method, an infrared type detection method, an electro magnetic induction type detection method, and a load sensing type detection method. In the description herein below, for the sake of simplicity, it is assumed that the user uses his/her finger(s) to make contact with the touch screen 2B in order to operate the smartphone 1.

The smartphone 1 determines a type of a gesture based on at least one of a contact detected by the touch screen 2B, a position where the contact is detected, a change of a position where the contact is detected, an interval between detected contacts, and the number of detection times of the contact. The gesture is an operation performed on the touch screen 2B. Examples of the gestures determined by the smartphone 1 include, but are not limited to, touch, long touch, release, swipe, tap, double tap, long tap, drag, flick, pinch in, and pinch out.

"Touch" is a gesture in which a finger makes contact with the touch screen 2B. The smartphone 1 determines a gesture in which the finger makes contact with the touch screen 2B as touch. "Long touch" is a gesture in which a finger makes contact with the touch screen 2B for longer than a given time. The smartphone 1 determines a gesture in which the finger makes contact with the touch screen 2B for longer than a given time as long touch.

"Release" is a gesture in which a finger separates from the touch screen 2B. The smartphone 1 determines a gesture in which the finger separates from the touch screen 2B as release. "Swipe" is a gesture in which a finger moves on the touch screen 2B with continuous contact thereon. The smartphone 1 determines a gesture in which the finger moves on the touch screen 2B with continuous contact thereon as swipe.

"Tap" is a gesture in which a touch is followed by a release. The smartphone 1 determines a gesture in which a touch is followed by a release as tap. "Double tap" is a gesture such that a gesture in which a touch is followed by a release is successively performed twice. The smartphone 1 determines a gesture such that a gesture in which a touch is followed by a release is successively performed twice as double tap.

"Long tap" is a gesture in which a long touch is followed by a release. The smartphone 1 determines a gesture in which a long touch is followed by a release as long tap. "Drag" is a gesture in which a swipe is performed from an area where a movable-object is displayed. The smartphone 1 determines a gesture in which a swipe is performed from an area where the movable-object displayed as drag.

"Flick" is a gesture in which a finger separates from the touch screen 2B while moving after making contact with the touch screen 2B. That is, "Flick" is a gesture in which a touch is followed by a release accompanied with a movement of the finger. The smartphone 1 determines a gesture in which the finger separates from the touch screen 2B while moving after making contact with the touch screen 2B as flick. The flick is performed, in many cases, with a finger moving along one direction. The flick includes "upward flick" in which the finger moves upward on the screen, "downward flick" in which the finger moves downward on the screen, "rightward flick" in which the finger moves rightward on the screen, and "leftward flick" in which the finger moves leftward on the screen, and the like. Movement of the finger during the flick is, in many cases, quicker than that of the finger during the swipe.

"Pinch in" is a gesture in which a swipe with a plurality of fingers is performed in a direction to move the fingers toward each other. The smartphone 1 determines a gesture in which the distance between a position of one finger and a position of another finger detected by the touch screen 2B becomes shorter as pinch in. "Pinch out" is a gesture in which a swipe with a plurality of fingers is performed in a direction to move the fingers away from each other. The smartphone 1 determines a gesture in which the distance between a position of one finger and a position of another finger detected by the touch screen 2B becomes longer as pinch out.

The smartphone 1 performs operations according to these gestures which are determined through the touch screen 2B. Therefore, user-friendly and intuitive operability is achieved. The operations performed by the smartphone 1 according to the determined gestures may be different depending on the screen displayed on the display 2A. In the following explanation, for the sake of simplicity of explanation, the fact that the touch screen detects the contact(s) and then the smartphone determines the type of the gesture as X based on the contact(s) may be simply described as "the smartphone detects X", "the controller detects X", "the touch screen detects X", or "the touch screen display detects X".

Figure 4:
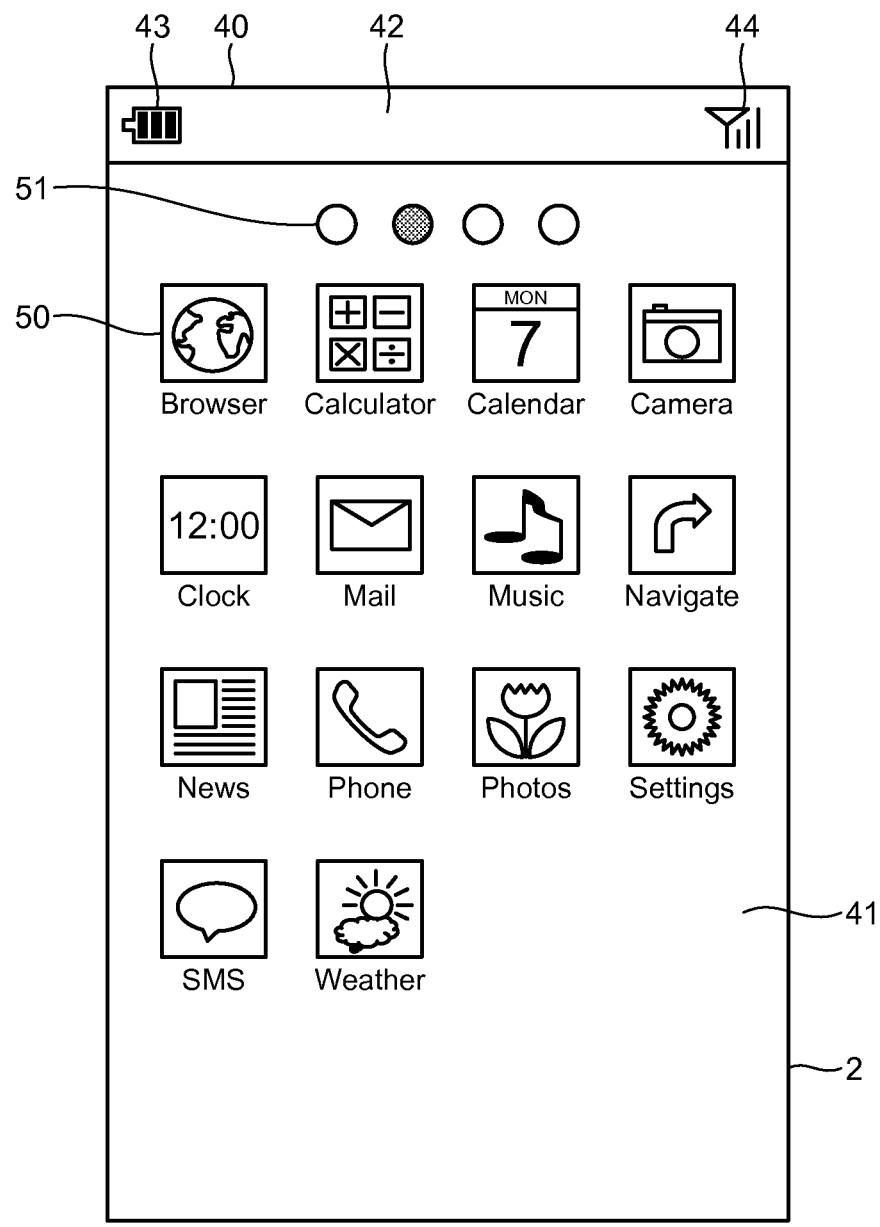
FIG. 4 is a diagram illustrating an example of a home screen.

An example of the screen displayed on the display 2A will be explained below with reference to FIG. 4. FIG. 4 represents an example of a home screen. The home screen may also be called "desktop", "standby screen", "idle screen", or "standard screen". The home screen is displayed on the display 2A. The home screen is a screen allowing the user to select which one of applications (programs) installed in the smartphone 1 is executed. The smartphone 1 executes the application selected on the home screen in the foreground. The screen of the application executed in the foreground is displayed on the display 2A.

Icons can be arranged on the home screen of the smartphone 1. A plurality of icons 50 are arranged on a home screen 40 illustrated in FIG. 4. Each of the icons 50 is previously associated with an application installed in the smartphone 1. When detecting a gesture for an icon 50, the smartphone 1 executes the application associated with the icon 50 for which the gesture is detected. For example, when detecting a tap on an icon 50 associated with a mail application, the smartphone 1 executes the mail application.

The icons 50 include an image and a character string. The icons 50 may contain a symbol or a graphic instead of an image. The icons 50 do not have to include either one of the image and the character string. The icons 50 are arranged based on a layout pattern. A wall paper 41 is displayed behind the icons 50. The wall paper may sometimes be called "photo screen", "back screen", "idle image", or "background image". The smartphone 1 can use an arbitrary image as the wall paper 41. The smartphone 1 may be configured so that the user can select an image to be displayed as the wall paper 41.

The smartphone 1 can include a plurality of home screens. The smartphone 1 determines, for example, the number of home screens according to setting by the user. The smartphone 1 displays a selected one on the display 2A even if there is a plurality of home screens.

The smartphone 1 displays an indicator (a locator) 51 on the home screen. The indicator 51 includes one or more symbols. The number of the symbols is the same as that of the home screens. In the indicator 51, a symbol corresponding to a home screen that is currently displayed is displayed in a different manner from that of symbols corresponding to the other home screens.

The indicator 51 in an example illustrated in FIG. 4 includes four symbols. This means the number of home screens is four. According to the indicator 51 in the example illustrated in FIG. 4, the second symbol from the left is displayed in a different manner from that of the other symbols. This means that the second home screen from the left is currently displayed.

The smartphone 1 can change a home screen to be displayed on the display 2A. When a gesture is detected while displaying one of home screens, the smartphone 1 changes the home screen to be displayed on the display 2A to another one. For example, when detecting a rightward flick, the smartphone 1 changes the home screen to be displayed on the display 2A to a home screen on the left side. For example, when detecting a leftward flick, the smartphone 1 changes the home screen to be displayed on the display 2A to a home screen on the right side. The smartphone 1 changes the home screen to be displayed on the display 2A from a first home screen to a second home screen, when a gesture is detected while displaying the first home screen, such that the area of the first home screen displayed on the display 2A gradually becomes smaller and the area of the second home screen displayed gradually becomes larger. The smartphone 1 may switch the home screens such that the first home screen is instantly replaced by the second home screen.

An area 42 is provided along the top edge of the display 2A. Displayed on the area 42 are a remaining mark 43 indicating a remaining amount of a power supply and a radio-wave level mark 44 indicating an electric field strength of radio wave for communication. The smartphone 1 may display time, weather, an application during execution thereof, a type of communication system, a status of a phone call, a mode of the device, an event occurring in the device, and the like in the area 42. In this manner, the area 42 is used to inform the user of various notifications. The area 42 may be provided on any screen other than the home screen 40. A position where the area 42 is provided is not limited to the top edge of the display 2A.

The home screen 40 illustrated in FIG. 4 is only an example, and therefore the configuration of each of elements, the arrangement of the elements, the number of home screens 40, the way to perform each of operations on the home screen 40, and the like do not have to be like the above mentioned explanation.

Figure 5:
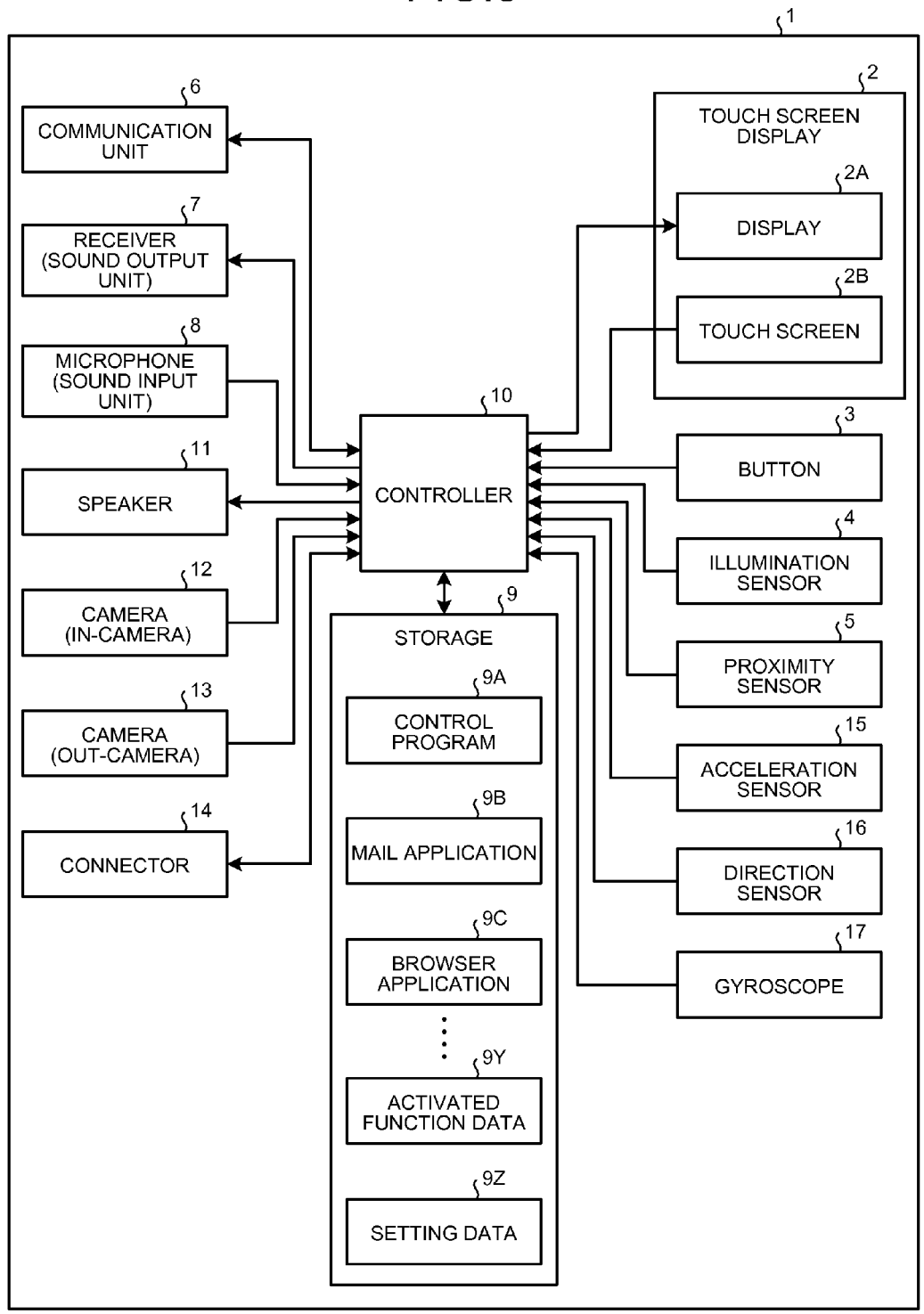
FIG. 5 is a block diagram illustrating functions of the smartphone.

FIG. 5 is a block diagram of the smartphone 1. The smartphone 1 includes the touch screen display 2, the button 3, the illumination sensor 4, the proximity sensor 5, a communication unit 6, the receiver 7, the microphone 8, a storage 9, a controller 10, the speaker 11, the cameras 12 and 13, the connector 14, an acceleration sensor 15, a direction (orientation) sensor 16, and a gyroscope 17.

The touch screen display 2 includes, as explained above, the display 2A and the touch screen 2B. The display 2A displays text, images, symbols, graphics, or the like. The touch screen 2B detects contact(s). The controller 10 detects an operation (a gesture) for the touch screen 2B in cooperation with the touch screen 2B.

The button 3 is operated by the user. The button 3 includes buttons 3A to 3F. The controller 10 detects an operation for the button 3 in cooperation with the button 3. Examples of the operations for the button 3 include, but are not limited to, a click, a double click, a triple click, a push, and a multi-push.

The buttons 3A to 3C are, for example, a home button, a back button, or a menu button. The button 3D is, for example, a power on/off button of the smartphone 1. The button 3D may function also as a sleep/sleep release button. The buttons 3E and 3F are, for example, volume buttons.

The illumination sensor 4 detects illumination of the ambient light of the smartphone 1. The illumination indicates intensity of light, lightness, or brightness. The illumination sensor 4 is used, for example, to adjust the brightness of the display 2A. The proximity sensor 5 detects the presence of a nearby object without any physical contact. The proximity sensor 5 detects the presence of the object based on a change of the magnetic field, a change of the return time of the reflected ultrasonic wave, etc. The proximity sensor 5 detects the presence of the nearby object, for example, when the touch screen display 2 is brought close to someone's face. The illumination sensor 4 and the proximity sensor 5 may be configured as one sensor. The illumination sensor 4 can be used as a proximity sensor.

The communication unit 6 performs communication via radio waves. A communication system supported by the communication unit 6 is wireless communication standard. The wireless communication standard includes, for example, a communication standard of cellar phones such as 2G, 3G, and 4G. The communication standard of cellar phones includes, for example, Long Term Evolution (LTE), Wideband Code Division Multiple Access (W-CDMA), CDMA 2000, a Personal Digital Cellular (PDC), a Global System for Mobile Communications (GSM), and a Personal Handy-phone System (PHS). The wireless communication standard further includes, for example, Worldwide Interoperability for Microwave Access (WiMAX), IEEE 802.11, Bluetooth, Infrared Data Association (IrDA), and Near Field Communication (NFC). The communication unit 6 may support one or more communication standards.

The receiver 7 and the speaker 11 are sound output units. The receiver 7 and the speaker 11 output a sound signal transmitted from the controller 10 as sound. The receiver 7 is used, for example, to output voice of the other party on the phone. The speaker 11 is used, for example, to output a ring tone and music. Either one of the receiver 7 and the speaker 11 may double as the other function. The microphone 8 is a sound input unit. The microphone 8 converts speech of the user or the like to a sound signal and transmit the converted signal to the controller 10.

The storage 9 stores therein programs and data. The storage 9 is used also as a work area that temporarily stores a processing result of the controller 10. The storage 9 may include any non-transitory storage medium such as a semiconductor storage medium and a magnetic storage medium. The storage 9 may include a plurality type of storage mediums. The storage 9 may include a combination of a portable storage medium such as a memory card, an optical disc, or a magneto-optical disc with a reader of the storage medium. The storage 9 may include a storage device used as a temporary storage area such as Random Access Memory (RAM).

Programs stored in the storage 9 include applications executed in the foreground or the background and a control program for assisting operations of the applications. The application causes the controller 10, for example, to display a screen on the display 2A and perform a process according to a gesture detected through the touch screen 2B. The control program is, for example, an OS. The applications and the control program may be installed in the storage 9 through communication by the communication unit 6 or through a non-transitory storage medium.

The storage 9 stores therein, for example, a control program 9A, a mail application 9B, a browser application 9C, activated function data 9Y, and setting data 9Z. The mail application 9B provides an e-mail function for composing, transmitting, receiving, and displaying e-mail, and the like. The browser application 9C provides a WEB browsing function for displaying WEB pages and editing bookmarks, or the like. The activated function data 9Y contains information related to statuses of activated functions. The activated function data 9Y may store the information related to statuses of activated functions for each of activated applications themselves or for each of the functions to be executed by the applications. "A function is activated" means "a program for executing the function is loaded to a memory of the controller 10 or a work area of the temporary storage area of the storage 9". The activated function data 9Y also contains information related to use statuses of the applications installed in the smartphone 1. The setting data 9Z contains information related to various settings on the operations of the smartphone 1.

Figure 6:
FIG. 6 is a diagram illustrating an example of activated function data.

FIG. 6 is a diagram illustrating an example of the activated function data 9Y. As illustrated in FIG. 6, the activated function data 9Y includes items such as Date, Time, Application, Screen Image, and Data being Processed, each of which stores information for each of the activated functions. The item of Date stores therein a date on which the function is activated. The item of Time stores therein a time at which the function is activated. The item of Application stores therein information for identifying an application to execute the activated function. The item of Screen Image stores therein a file name of a screen image to be displayed on the display 2A or the image itself when the activated function is executed. The item of Data being Processed stores therein, if there is any data being processed by the activated function, a file name of the data being processed or the data itself. The data being processed is data newly acquired by the function or data being edited, and the like.

The control program 9A provides a function related to various controls for operating the smartphone 1. The control program 9A controls, for example, the communication unit 6, the receiver 7, and the microphone 8 to make a phone call. The function provided by the control program 9A includes a function for performing various controls such as release of the locked state or execution of various functions according to a gesture detected through the touch screen 2B during the display of the lock screen. The function provided by the control program 9A includes a function for performing various controls such as execution of various functions according to a gesture detected through the touch screen 2B during the display of the home screen. The functions provided by the control program 9A can be used in combination with a function provided by the other program such as the mail application 9B.

The controller 10 is a processing unit. Examples of the processing units include, but are not limited to, a Central Processing Unit (CPU), System-on-a-chip (SoC), a Micro Control Unit (MCU), and a Field-Programmable Gate Array (FPGA). The controller 10 integrally controls the operations of the smartphone 1 to implement various functions.

Specifically, the controller 10 executes instructions contained in the program stored in the storage 9 while referring to the data stored in the storage 9 as necessary. The controller 10 controls a function unit according to the data and the instructions to thereby implement the various functions. Examples of the function units include, but are not limited to, the display 2A, the communication unit 6, the receiver 7, and the speaker 11. The controller 10 can change the control of the function unit according to the detection result of a detector. Examples of the detectors include, but are not limited to, the touch screen 2B, the button 3, the illumination sensor 4, the proximity sensor 5, the microphone 8, the camera 12, the camera 13, the acceleration sensor 15, the direction sensor 16, and the gyroscope 17.

The controller 10 executes, for example, the control program 9A to thereby change information displayed on the display 2A according to a gesture detected through the touch screen 2B.

The camera 12 is an in-camera for photographing an object facing the front face 1A. The camera 13 is an out-camera for photographing an object facing the back face 1B.

The connector 14 is a terminal to which other device is connected. The connector 14 may be a general-purpose terminal such as a Universal Serial Bus (USB), a High-Definition Multimedia Interface (HDMI), Light Peak (Thunderbolt), and an earphone/microphone connector. The connector 14 may be a dedicated terminal such as a dock connector. Examples of the devices connected to the connector 14 include, but are not limited to, an external storage device, a speaker, and a communication device.

The acceleration sensor 15 detects a direction and a magnitude of acceleration applied to the smartphone 1. The direction sensor 16 detects a direction of geomagnetism. The gyroscope 17 detects an angle and an angular velocity of the smartphone 1. The detection results of the acceleration sensor 15, the direction sensor 16, and the gyroscope 17 are used in combination with each other in order to detect a position of the smartphone 1 and a change of its attitude.

Part or all of the programs and the data stored in the storage 9 in FIG. 5 may be downloaded from any other device through communication by the communication unit 6. Part or all of the programs and the data stored in the storage 9 in FIG. 5 may be stored in the non-transitory storage medium that can be read by the reader included in the storage 9. Part or all of the programs and the data stored in the storage 9 in FIG. 5 may be stored in the non-transitory storage medium that can be read by a reader connected to the connector 14. Examples of the non-transitory storage mediums include, but are not limited to, an optical disc such as CD, DVD, and Blu-ray, a magneto-optical disc, magnetic storage medium, a memory card, and solid-state storage medium.

The configuration of the smartphone 1 illustrated in FIG. 5 is only an example, and therefore it can be modified as required within a scope that does not depart from the gist of the present invention. For example, the number and the type of the button 3 are not limited to the example of FIG. 5. The smartphone 1 may be provided with buttons of a numeric keypad layout or a QWERTY layout and so on as buttons for operation of the screen instead of the buttons 3A to 3C. The smartphone 1 may be provided with only one button to operate the screen, or with no button. In the example of FIG. 5, the smartphone 1 is provided with two cameras; however, the smartphone 1 may be provided with only one camera or with no camera. In the example of FIG. 5, the smartphone 1 is provided with three types of sensors in order to detect its position and attitude; however, the smartphone 1 does not have to be provided with some of the sensors. Alternatively, the smartphone 1 may be provided with any other type of sensor for detecting at least one of the position and the attitude.

Examples of the control based on the functions provided by the control program 9A will be explained below with reference to FIG. 7 to FIG. 15. The functions provided by the control program 9A include a function for executing various controls according to a gesture detected through the touch screen 2B during the display of the lock screen, and a function for executing various controls according to a gesture detected through the touch screen 2B during the display of the home screen. Examples of the control executed according to user's instructions during the display of the lock screen will be explained below with reference to FIG. 7 to FIG. 12.

Figure 7:
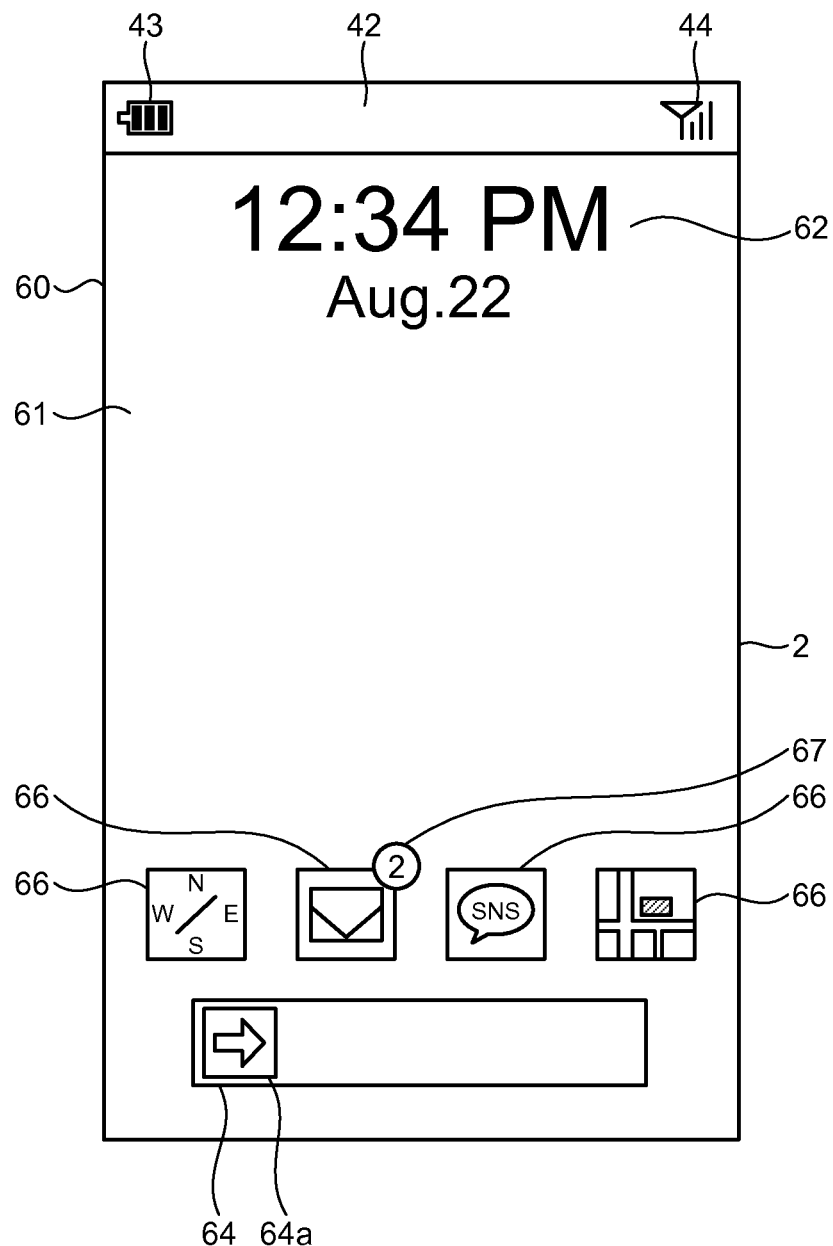
FIG. 7 is a diagram illustrating an example of a lock screen.

An example of the lock screen will be explained below with reference to FIG. 7. The lock screen is displayed on the display 2A while the locked state is set, i.e., the setting of the locked state is ON. FIG. 7 is an example of the lock screen. A lock screen 60 indicates that the locked state is set. When a preset unlock gesture is detected, the lock screen 60 moves to another screen. That is, the lock screen 60 is a screen in which any gesture other than a preset gesture is invalidated. The smartphone 1 does not accept various operations until a specific gesture is detected on the lock screen.

The lock screen 60 illustrated in FIG. 7 has a date/time image 62, an unlock operation area 64 including a key icon 64a, and four activated icons 66, which are arranged on a wallpaper 61. The lock screen 60 has an area 42, which is identical to the area 42 on the home screen 40, provided along the top edge of the display 2A. The lock screen 60 displays a remaining mark 43 indicating a remaining amount of a power supply and a radio-wave level mark 44 indicating an electric field strength of radio wave for communication in the area 42. The wallpaper 61 is displayed behind the date/time image 62, the unlock operation area 64, and the four activated icons 66.

The date/time image 62 indicates time and date, which appears in an area located in an upper portion of the lock screen 60 and below the area 42. The date/time image 62 illustrated in FIG. 7 has a status display indicating a time which is "12:34 PM" representing 12 o'clock and 34 minutes in the afternoon and a status display indicating a date which is "Aug. 22" representing 22nd, August.

The unlock operation area 64 is an area, where the key icon 64a is displayed, used when the user releases the locked state. The key icon 64a is an arrow image which is displayed on the left edge of the unlock operation area 64. In the present embodiment, the key icon 64a is an image that is dragged by a user's gesture to release the locked state. When detecting a swipe that starts from the key icon 64a, the smartphone 1 moves the display position of the key icon 64a according to the movement of the contact position of the swipe. When detecting an unlock operation in which the key icon 64a is moved from the left edge of the screen to the right edge of the screen in the unlock operation area 64, the smartphone 1 releases the locked state and displays a next screen on the touch screen display 2. The unlock operation according to the present embodiment includes a swipe that starts from the key icon 64a and ends at the right edge of the screen in the unlock operation area 64. The smartphone 1 may set a flick operation performed for the key icon 64a in a predetermined direction as the unlock operation. The examples of the next screen include the home screen and a screen for an executed application, etc.

The activated icon 66 is associated with an activated function. The activated icon 66 according to the present embodiment indicates an application to execute an activated function. The activated icon 66 on the far left indicates that a compass application is being activated. The second activated icon 66 from the left indicates that the mail application 9B is being activated. The third activated icon 66 from the left indicates that a Short Message Service (SMS) application is being activated. The fourth activated icon 66 from the left indicates that a map application is being activated. Displayed on the second activated icon 66 is a notification pop 67 that notifies the user of arrival of a new mail. The smartphone 1 displays the notification pop 67 with a number "2" to notify the user that two new mails have arrived. The lock screen 60 can notify the user that the activated function has obtained new information. Although the example of displaying the four activated icons 66 on the lock screen 60 is illustrated in FIG. 7, the number of activated icons 66 to be displayed on the lock screen 60 can be increased or decreased according to the number of activated functions. Therefore, the number of activated icons 66 to be displayed on the lock screen 60 is not limited thereto.

The activated icons 66 are arranged on the upper side of the unlock operation area 64 on the screen. When detecting a swipe that starts from one of the activated icons 66, the smartphone 1 moves the display position of the activated icon 66 according to the movement of the contact position of the swipe. When detecting a specific gesture performed for an activated icon 66, the smartphone 1 executes various processes associated with the activated icon 66. Examples of the various processes include, but are not limited to, execution of an application to perform a function associated with the activated icon 66 and deactivation of a function associated with the activated icon 66. The specific gesture will be explained later.

Figure 8:
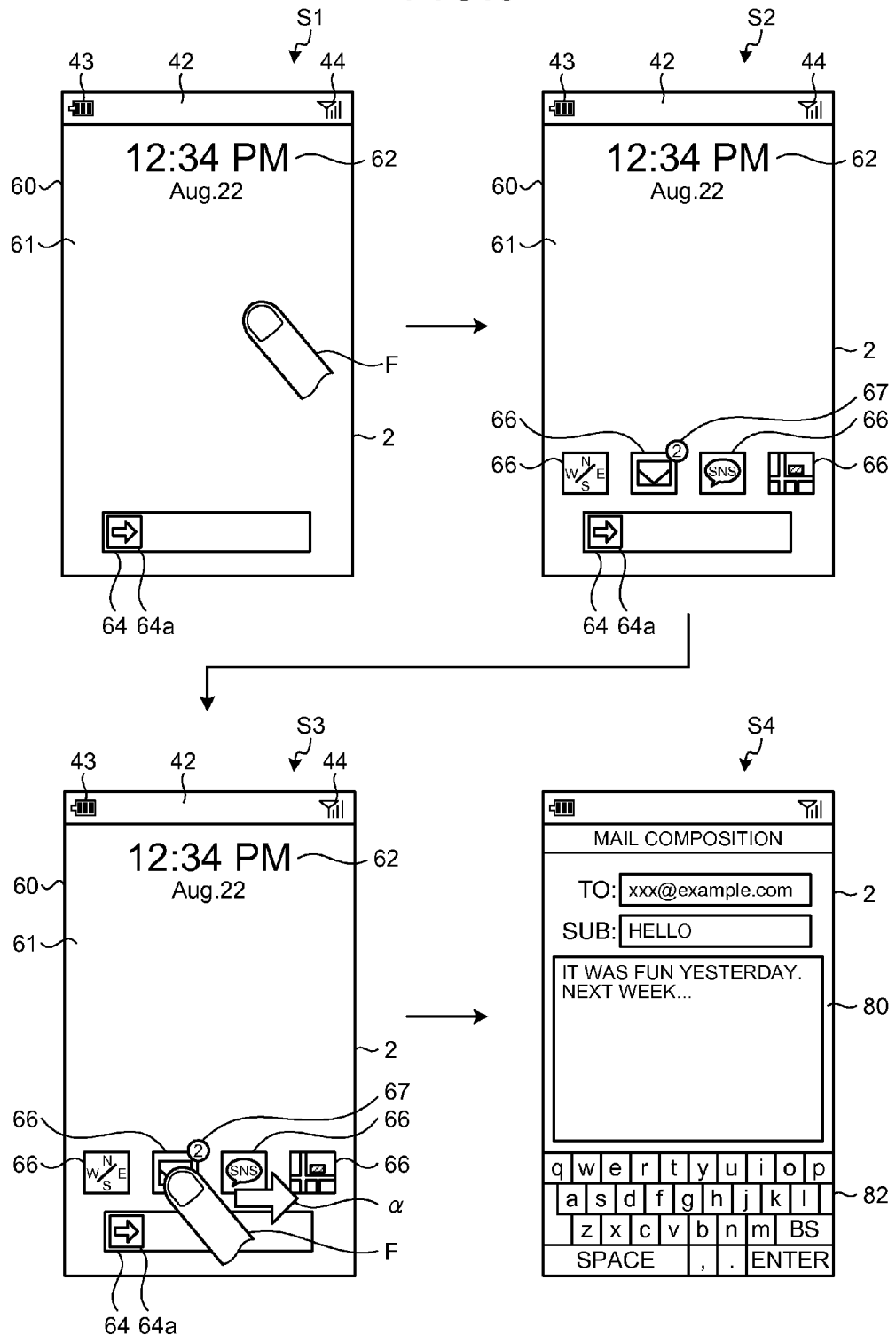
FIG. 8 is a diagram illustrating an example of control during display of the lock screen.

Next, processes and functions executed in the locked state will be explained below with reference to FIG. 8. FIG. 8 is a diagram illustrating an example of control during the display of the lock screen. At Step S1 illustrated in FIG. 8, the lock screen 60 is displayed on the display 2A. When a return operation is detected in a power-saving mode or when a switching operation from the unlocked state to the locked state is detected, the smartphone 1 displays the lock screen 60 on the display 2A. The lock screen 60 at Step S1 has the date/time image 62 and the unlock operation area 64 including the key icon 64a, which are arranged on the wallpaper 61. In other words, no activated icons 66 are displayed on the lock screen 60 at Step S1.

At Step S1, the wallpaper 61 is long-touched by a user's finger F. In this case, the smartphone 1 detects the long touch in an area where the wallpaper 61 is displayed. When detecting the long touch for the wallpaper 61, the smartphone 1 displays the activated icons 66 on the lock screen 60 as illustrated at Step S2.

At Step S3, the second activated icon 66 from the left (hereinafter, simply referred as to "activated icon 66") is touched by the user's finger F. In this case, the smartphone 1 detects the touch in the area where the activated icon 66 is displayed. Thereafter, the user flicks the finger F touching the activated icon 66 in a direction indicated by arrow α, at Step S3. In this case, the smartphone 1 detects a flick that starts from the activated icon 66 and whose contact position moves in the arrow α direction.

When detecting the flick gesture performed for the activated icon 66 as illustrated at Step S3, then at Step S4, the smartphone 1 displays a mail composition screen 80 on the touch screen display 2. That is, the smartphone 1 executes the mail application associated with the flicked activated icon 66 to display the mail composition screen 80. The mail composition screen 80 is an image including a keyboard 82. The smartphone 1 may be configured to release the locked state and execute the function associated with the flicked activated icon 66. In other words, the smartphone 1 may be configured to move to the home screen 40 or so after the function associated with the flicked activated icon 66 is ended so that another function can also be executed. The smartphone 1 may be configured to execute the function associated with the flicked activated icon 66 without releasing the locked state. In other words, the smartphone 1 may be configured to return to the lock screen 60 so that another function cannot be executed.

Figure 9:
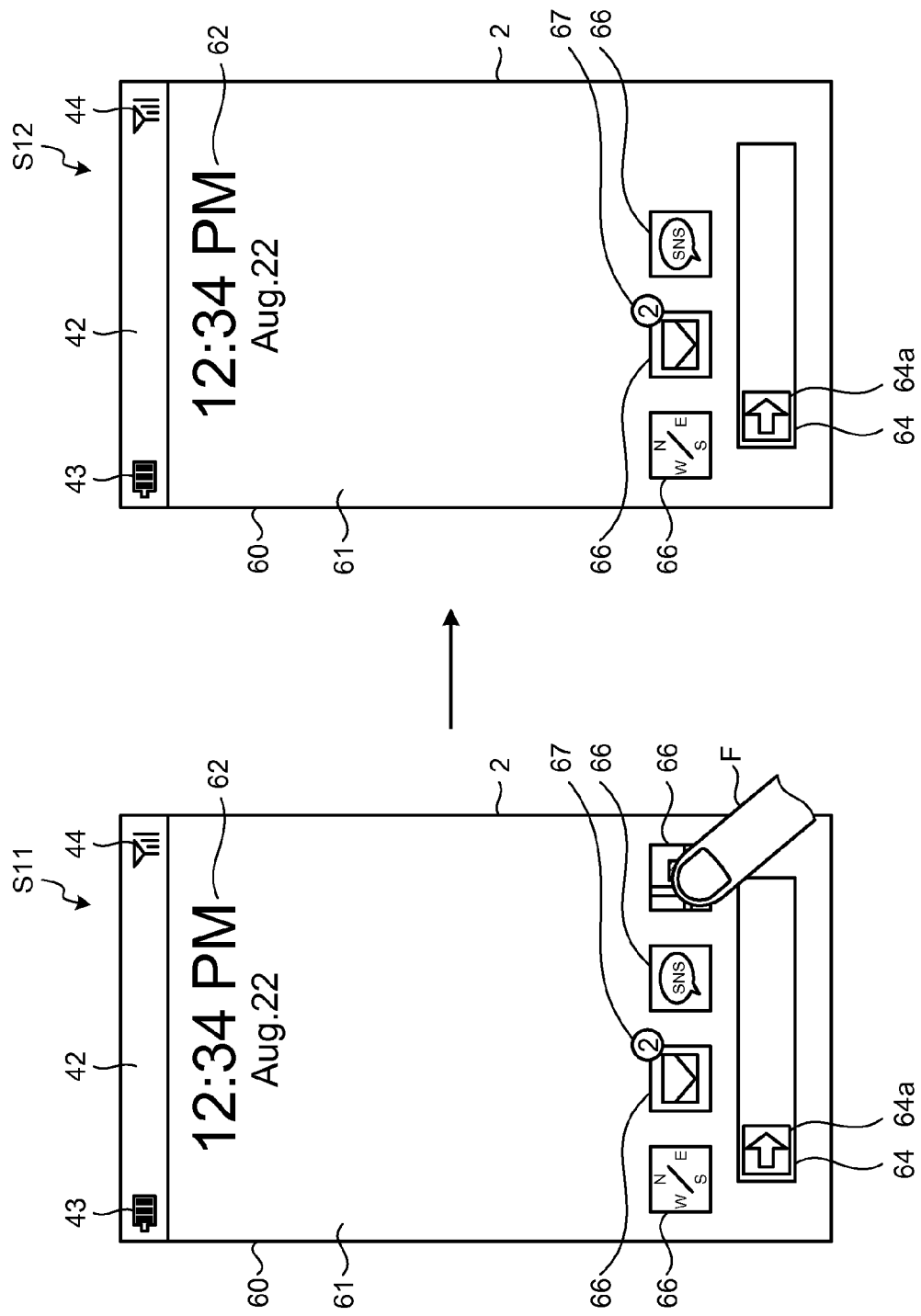
FIG. 9 is a diagram illustrating an example of the control during the display of the lock screen.

Next, processes and functions executed in the locked state will be explained below with reference to FIG. 9. FIG. 9 is a diagram illustrating an example of the control during the display of the lock screen. At Step S11 illustrated in FIG. 9, the lock screen 60 is displayed on the display 2A. The lock screen 60 at Step S11 has the date/time image 62, the unlock operation area 64, and the activated icons 66, which are arranged on the wallpaper 61. That is, the lock screen 60 at Step S11 is a screen that displays the activated icons 66 like the lock screen 60 at Step S2 of FIG. 8.

At Step S11, the activated icon 66 is long-touched by the user's finger F. Specifically, the activated icon 66 on the far right is long-touched. In this case, the smartphone 1 detects the touch in the area where the activated icon 66 is displayed. When detecting the long touch for the activated icon 66, the smartphone 1 stops the display of the long-touched activated icon 66 as illustrated at Step S12. Thus, the three activated icons 66 are displayed on the lock screen 60 at Step S12. In addition, the smartphone 1 deactivates the function associated with the long-touched activated icon 66. That is, the smartphone 1 is in a state in which the function is not activated.

As explained above, the smartphone 1 according to the present embodiment displays the activated icon 66 on the lock screen 60, which enables the user to check the activated function during the display of the lock screen 60. Thus, the user can easily and more accurately recognize the status of the smartphone 1. Specifically, the user can recognize which function is being activated without input of the unlock operation to start up a screen for checking the activated function.

As illustrated at Step S3 and Step S4, when the activated icon is flicked, the smartphone 1 displays an execution screen for the activated function associated with the flicked activated icon. This enables the user to easily display the screen for executing the activated function, from the lock screen 60.

As illustrated at Step S11 and Step S12, when the activated icon 66 is long-tapped, the smartphone 1 deactivates the function associated with the activated icon 66. This enables the user to easily deactivate the activated function.

The smartphone 1 according to the embodiment is configured to associate execution of the function, which is associated with the activated icon 66, with the flick for the activated icon and to associate deactivation of the function, which id associated with the activated icon 66, with the long tap for the activated icon; however, the embodiment is not limited thereto. The smartphone 1 can associate various gestures with execution or deactivation of the function associated with the activated icon 66, respectively. For example, a double tap for the activated icon 66 or a swipe to a predetermined position may be associated with execution or deactivation of the function associated with the activated icon 66. Whether to execute or to deactivate the function associated with the activated icon 66 may be determined depending upon the direction of the flick.

The smartphone 1 can switch between displaying and hiding of the activated icon 66 through a user's operation. This enables the user to display or to hide the activated icon 66 as required. The smartphone 1 may set the activated icon 66 to be hidden at the beginning of the display of the lock screen 60 as explained in the present embodiment. This enables the user to display the activated icon 66 when needed.

The smartphone 1 according to the present embodiment has been explained as the case capable of simultaneously displaying the four activated icons 66 on the lock screen 60; however, the embodiment is not limited thereto. The smartphone 1 may set the display area of the activated icons 66 to be scrolled if the number of activated icons 66 is greater than the number of icons that can be displayed at one time on the lock screen 60. That is, the smartphone 1 may display part of the activated icons 66 in a predetermined area of the lock screen 60 and may change, when detecting a scrolling operation, the activated icon 66 to be displayed in the predetermined area of the lock screen 60.

Figure 10:
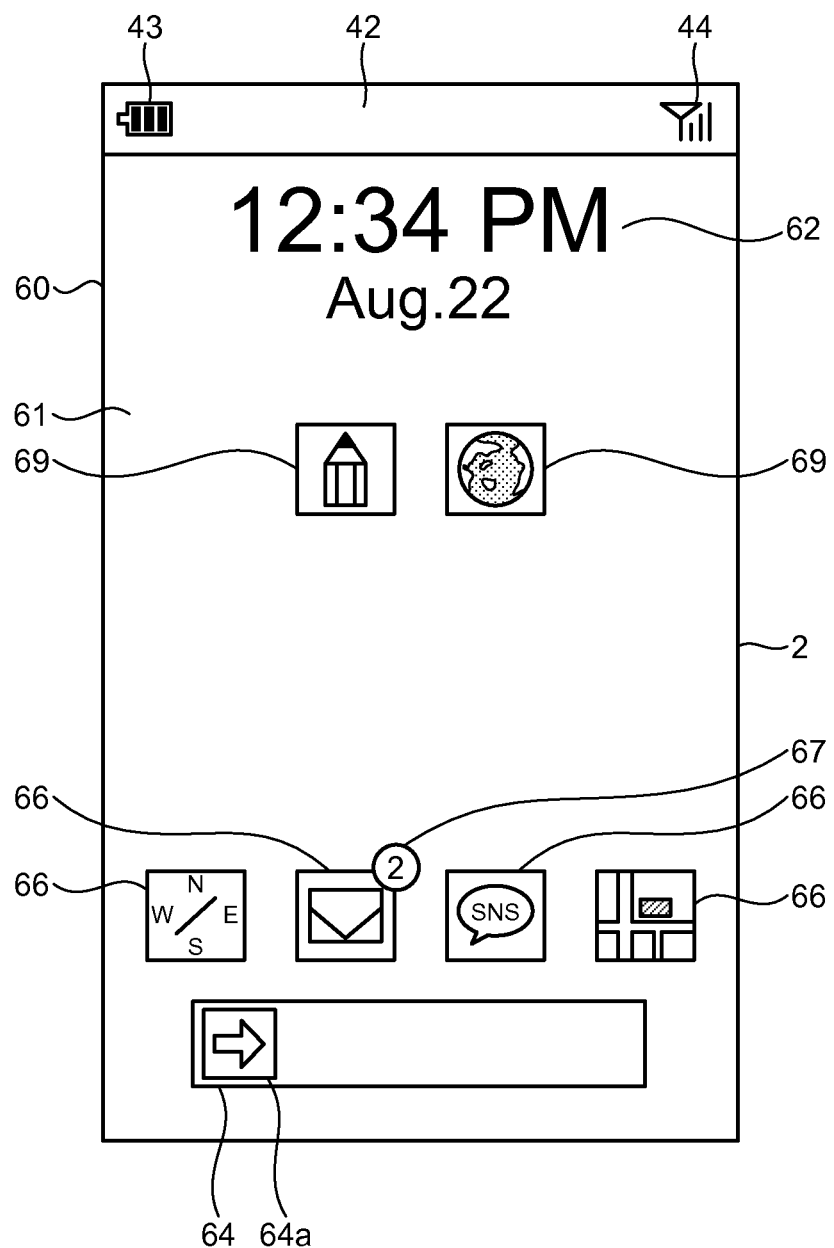
FIG. 10 is a diagram illustrating another example of the lock screen.

Another example of the lock screen will be explained below with reference to FIG. 10. FIG. 10 is a diagram illustrating another example of the lock screen. The lock screen 60 illustrated in FIG. 10 has the same configuration as that illustrated in FIG. 7 except for icons 69. The lock screen 60 illustrated in FIG. 10 has application icons 69 displayed below the date/time image 62. The application icon 69 is associated with a specific application installed in the smartphone 1. When detecting a specific gesture performed for an application icon 69, the smartphone 1 executes the application associated with the application icon 69. As the specific gesture, various gestures can be used, such as a flick for the application icon 69, a swipe toward the outside of the screen, a double tap, etc.

The smartphone 1 displays an application icon 69 as well as the activated icon 66 on the lock screen 60, so that the function being not activated can also be activated from the lock screen 60 to be executed. The application icon 69 may always be displayed on the lock screen 60, or displaying and hiding of the application icon 69 may be switched to each other by the user's operation similarly to the case of the activated icon 66.

Figure 11:
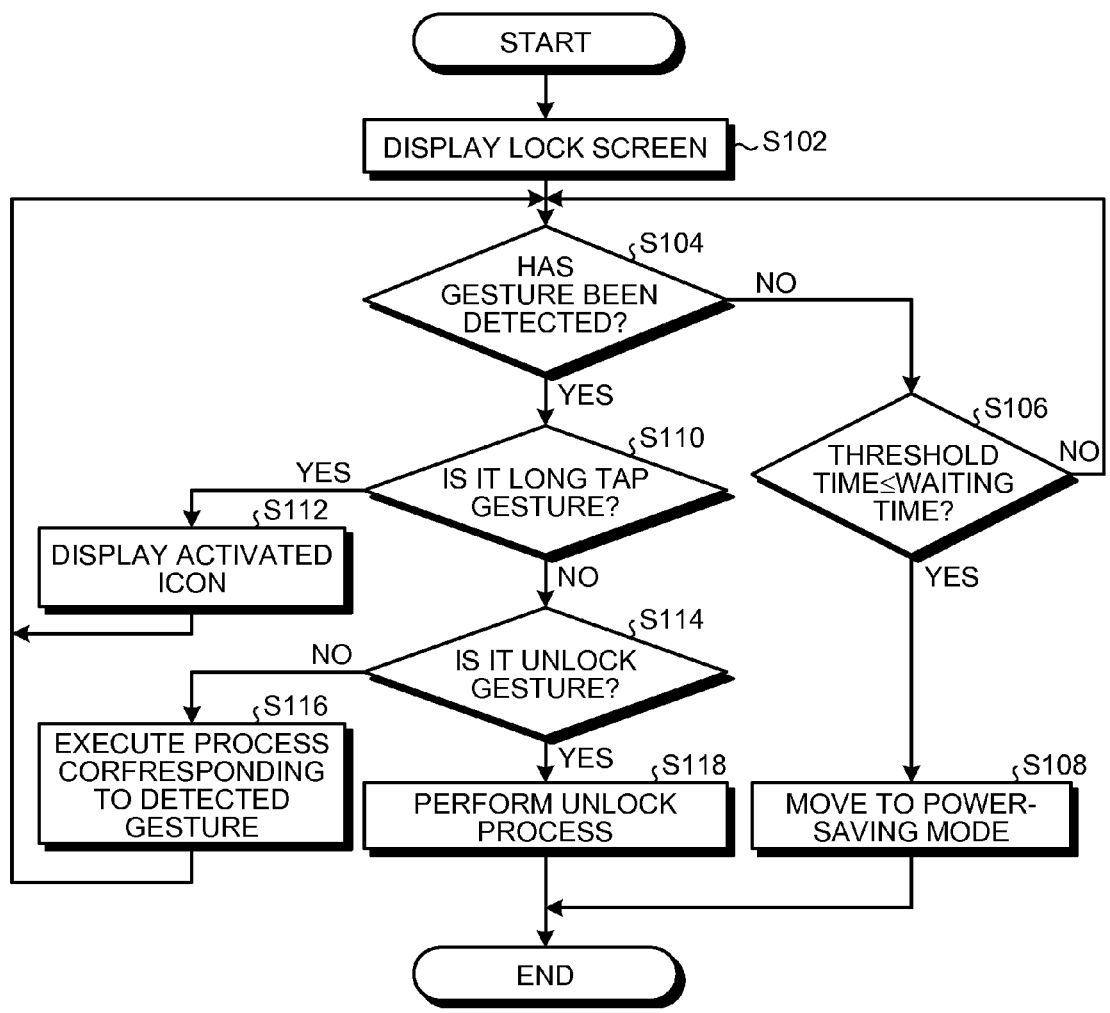
FIG. 11 is a flowchart illustrating a procedure for the control executed in a locked state.

An example of a procedure for control based on the function provided by the control program 9A will be explained below with reference to FIG. 11. FIG. 11 is a procedure for the control executed in the locked state, especially for the control executed during the display of the lock screen. The procedure illustrated in FIG. 11 is implemented by the controller 10 executing the control program 9A. The procedure illustrated in FIG. 11 is executed when the locked state is set and an operation of displaying the screen on the display 2A is detected. The case in which the operation of displaying the screen on the display 2A is detected includes, for example, a case in which the power-saving mode is set and an operation of returning to the screen is detected when the screen is not displayed on the touch screen display 2. The controller 10 may execute other procedure for the control related to the lock screen 60 in parallel to the procedure illustrated in FIG. 11.

At Step S102, the controller 10 displays the lock screen on the touch screen display 2. The lock screen 60 displayed at Step S102 does not display the activated icons 66. After the display of the lock screen at Step S102, at Step S104, the controller 10 determines whether a gesture is detected. That is, the controller 10 acquires a detection result of the touch screen 2B and determines whether a gesture has been detected based on the acquired detection result. When it is determined that a gesture has not been detected at Step S104 (No at Step S104), then at Step S106, the controller 10 determines whether a waiting time is equal to or longer than a threshold time. The waiting time is a period of time during which no operation is detected. The controller 10 determines whether the waiting time being an elapsed time since the latest operation is finished is a predetermined threshold time or more.

When it is determined that the waiting time is not equal to and not longer than the threshold time at Step S106 (No at Step S106), that is, that the threshold time is longer than the waiting time, the controller 10 proceeds to Step S104, and determines again whether a gesture has been detected. When it is determined that the waiting time is equal to or longer than the threshold time at Step S106 (Yes at Step S106), then at Step S108, the controller 10 moves to the power-saving mode and ends the present process. That is, the controller 10 turns off the touch screen display 2 so as not to display the lock screen, and ends the present process.

When it is determined that a gesture has been detected at Step S104 (Yes at Step S104), then at Step S110, the controller 10 determines whether the gesture is a long tap gesture. Specifically, the controller 10 detects whether the gesture detected at Step S104 is a long tap performed for the area where the wallpaper 61 is displayed. When it is determined that the gesture is the long tap at Step S110 (Yes at Step S110), then at Step S112, the controller 10 displays the activated icons 66, and proceeds to Step S104. When it is determined that the gesture is not the long tap at Step S110 (No at Step S110), then at Step S114, the controller 10 determines whether the gesture is an unlock gesture. That is, the controller 10 determines whether the gesture detected at Step S104 is an unlock gesture. When it is determined that the gesture is not the unlock gesture at Step S114 (No at Step S114), then at Step S116, the controller 10 executes the process corresponding to the detected gesture, and proceeds to Step S104. The examples of the process corresponding to the detected gesture include a process of moving the display position of the application icon displayed on the lock screen, and a process of displaying a screen that can be displayed on the lock screen, such as a help screen or an emergency message screen. When it is determined that the gesture is the unlock gesture at Step S114 (Yes at Step S114), then at Step S118, the controller 10 releases the locked state and ends the present process. When the locked state is released at Step S118, the controller 10 displays the screen for the executed application or the home screen on the touch screen display 2.

Figure 12:
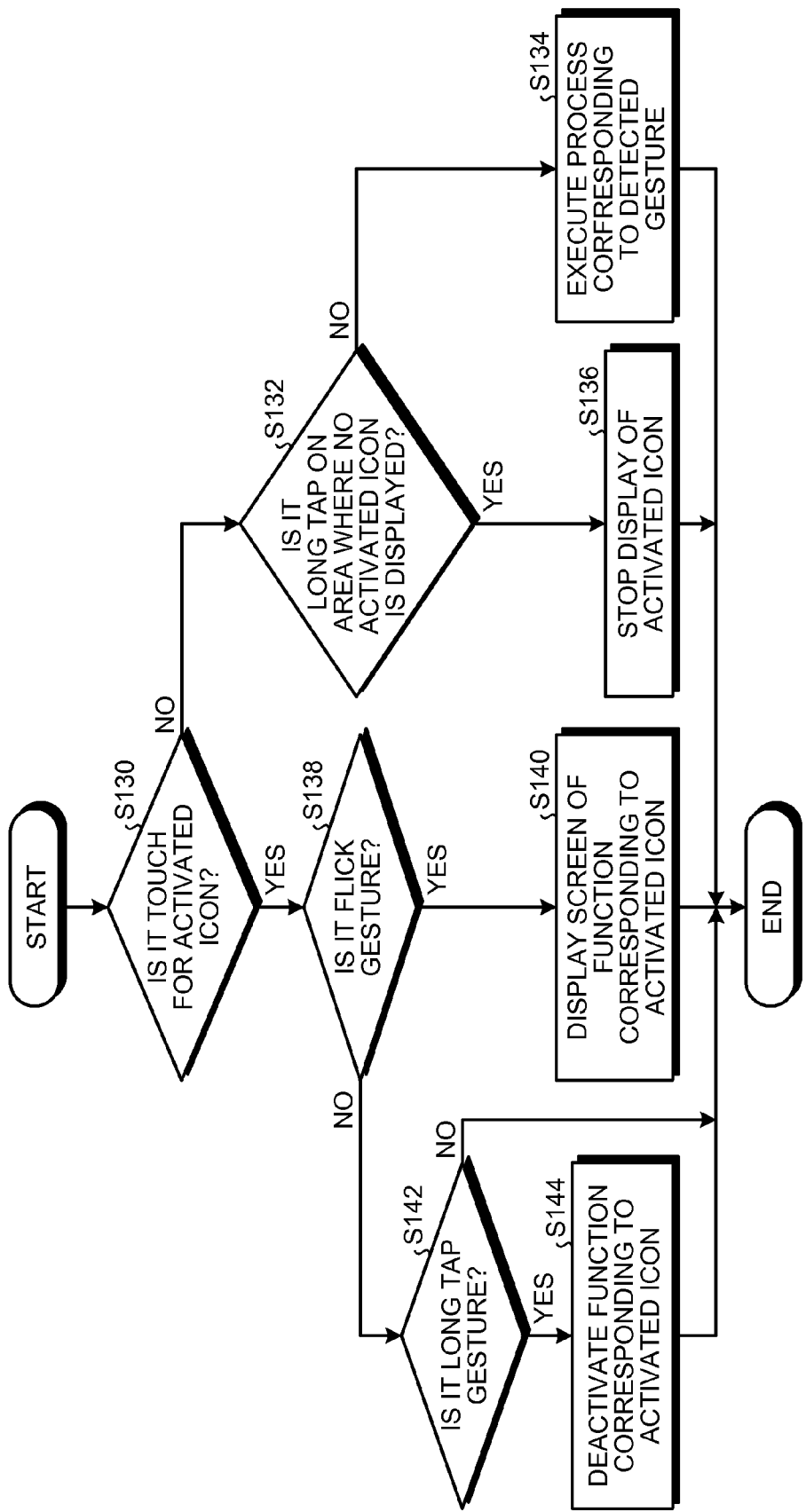
FIG. 12 is a flowchart illustrating a procedure for the control executed in the locked state.

Next, an example of the process at Step S116 in the flowchart of FIG. 11 will be explained below with reference to FIG. 12. The procedure illustrated in FIG. 12 is implemented by the controller 10 executing the control program 9A. The procedure illustrated in FIG. 12 may be executed only when the activated icon 66 is displayed on the lock screen 60. At Step S130, the controller 10 determines whether the gesture is a touch for the activated icon.

When it is determined that the gesture is not a touch for the activated icon at Step S130 (No at Step S130), then at Step S132, the controller 10 determines whether the gesture is a long tap for an area where no activated icon is displayed. Preferably, the area where no activated icon is displayed does not contain the unlock operation area 64. When it is determined that the gesture is not a long tap for the area at Step S132 (No at Step S132), then at Step S134, the controller 10 executes the process corresponding to the detected gesture, and ends the present process.

When it is determined that the gesture is a long tap for the area at Step S132 (Yes at Step S132), then at Step S136, the controller 10 stops the display of the activated icon, i.e., hides the activated icon, and ends the present process.

When it is determined that the gesture is a touch on the activated icon at Step S130 (Yes at Step S130), then at Step S138, the controller 10 determines whether the gesture is a flick gesture. That is, the controller 10 determines whether the gesture turns out to be a flick gesture performed for the activated icon. When it is determined that the gesture turns out to be a flick gesture at Step S138 (Yes at Step S138), then at Step S140, the controller 10 displays a screen of the function corresponding to the activated icon and ends the present process. In other words, the controller 10 displays a screen of an application to execute the function associated with the flicked activated icon.

When it is determined that the gesture turns out not to be a flick gesture at Step S138 (No at Step S138), then at Step S142, the controller 10 determines whether the gesture turns out to be a long tap gesture.

When it is determined that the gesture turns out to be a long tap gesture at Step S142 (Yes at Step S142), then at Step S144, the controller 10 deactivates the function corresponding to the activated icon, hides the activated icon, and ends the present process. When it is determined that the gesture turns out not to be a long tap gesture at Step S142 (No at Step S142), the controller 10 invalidates the detected gesture, and ends the present process.

Figure 13:
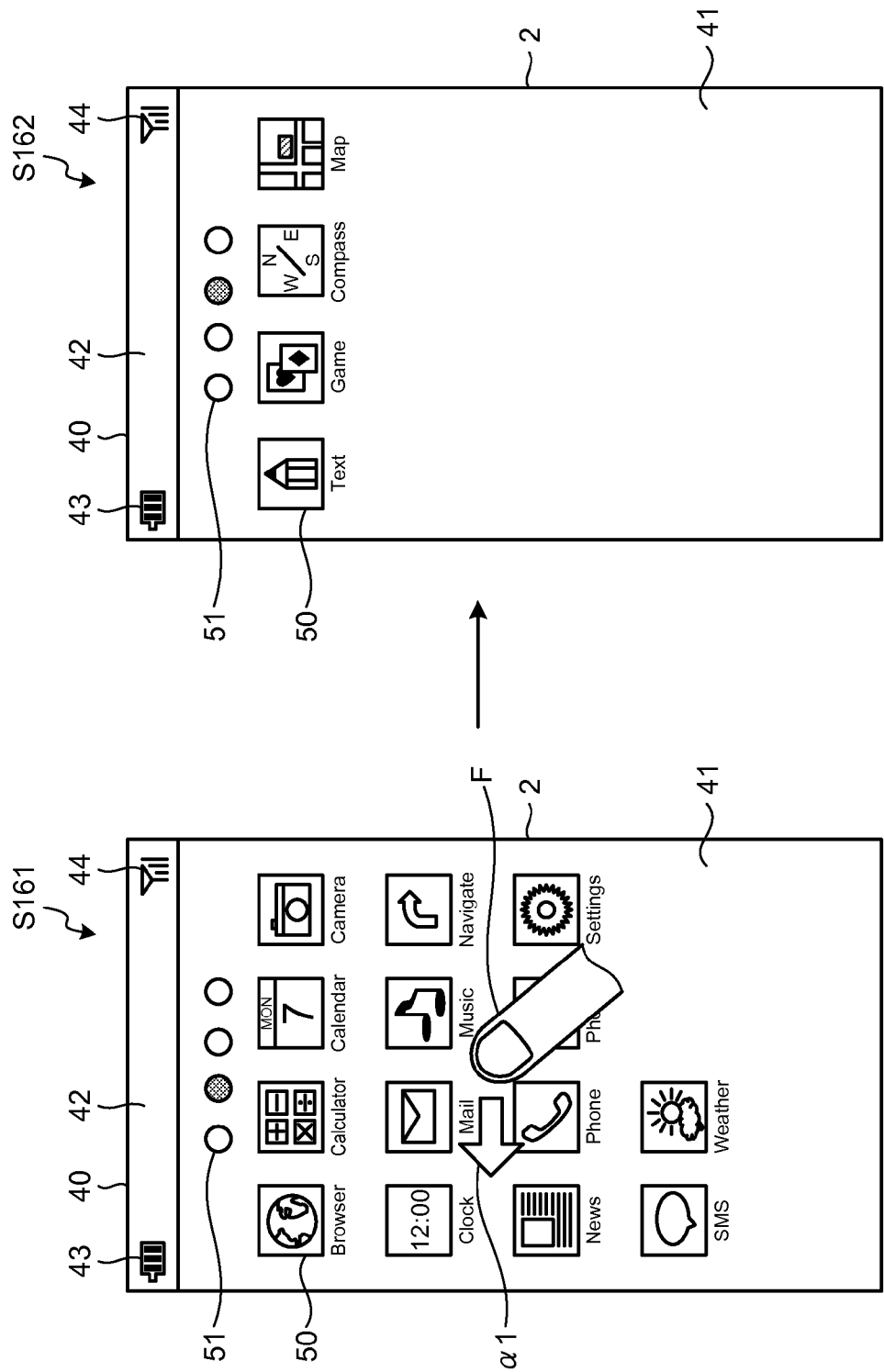
FIG. 13 is a diagram illustrating an example of control during the display of the home screen.
Figure 14:
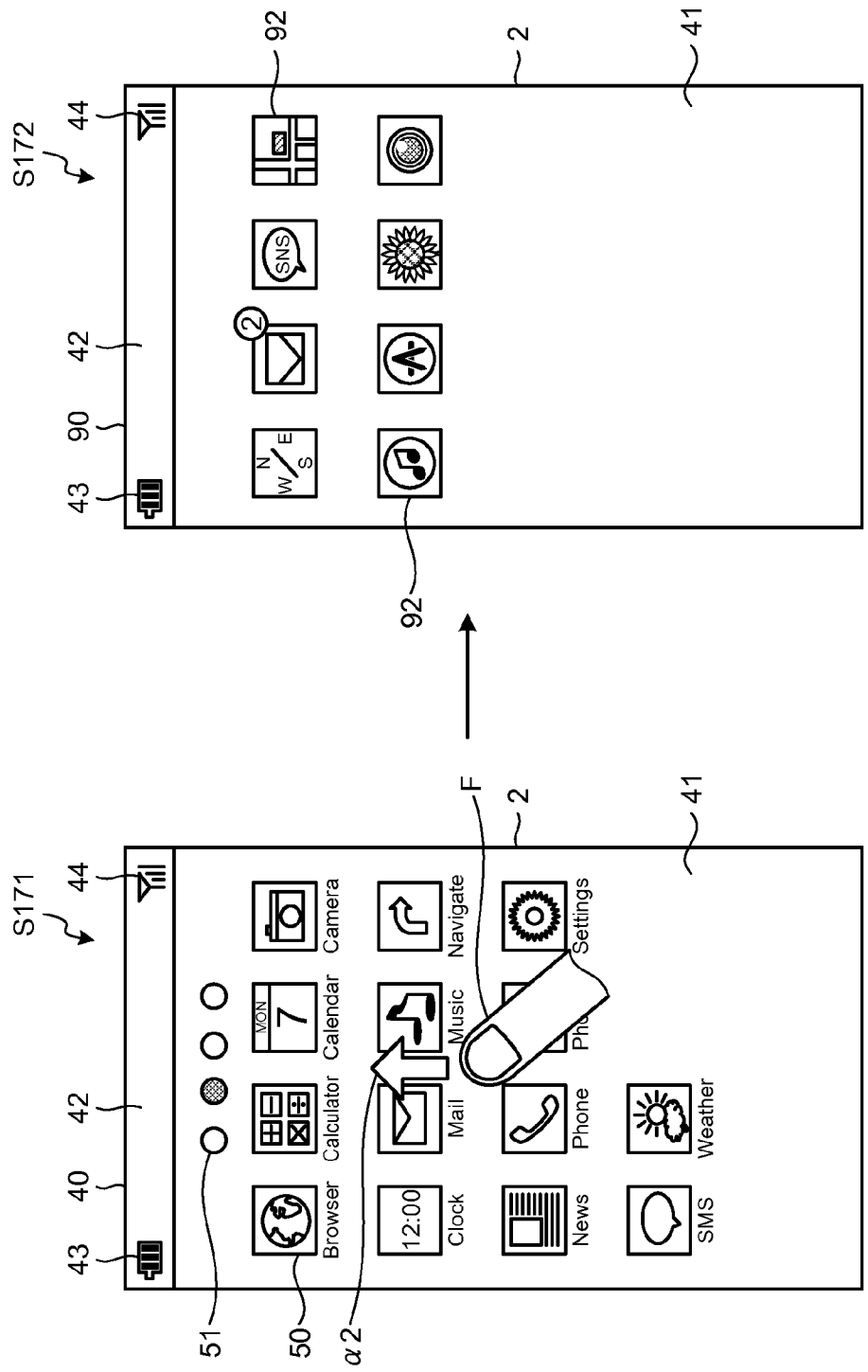
FIG. 14 is a diagram illustrating an example of the control during the display of the home screen.
Figure 15:
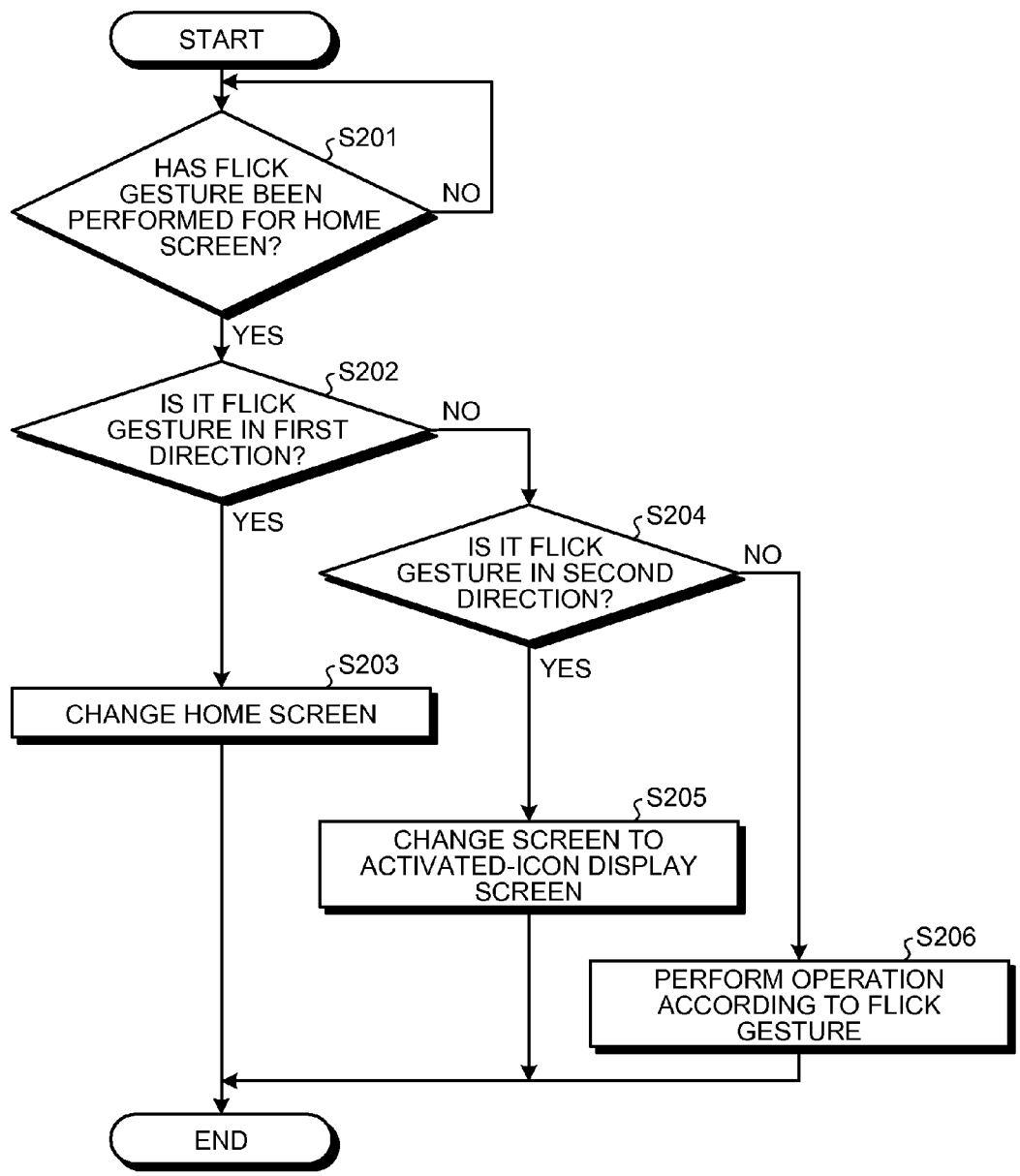
FIG. 15 is a flowchart illustrating a procedure for the control executed during the display of the home screen.

Examples of the control executed according to a user's instruction during the display of the home screen will be explained below with reference to FIG. 13 to FIG. 15. FIG. 13 is a diagram illustrating an example of the control during the display of the home screen. FIG. 14 is a diagram illustrating an example of the control during the display of the home screen. When detecting a flick gesture during the display of the home screen 40, the controller 10 switches between processes to be executed depending upon whether the direction of the flick gesture is a first direction or a second direction. In the present embodiment, the first direction is a horizontal direction of the screen and the second direction is a vertical direction thereof. When detecting the flick gesture in the first direction, the smartphone 1 changes the display of the home screen 40. Specifically, the smartphone 1 displays a neighbor home screen 40. When detecting the flick gesture in the second direction, the smartphone 1 displays a screen where the activated icons are arranged. Specifically, the smartphone 1 displays a screen different from a neighbor home screen 40. Examples of the control will be explained below with reference to FIG. 13 and FIG. 14.

At Step S161 illustrated in FIG. 13, the home screen 40 is displayed on the display 2A. When detecting the unlock operation or when detecting the operation for ending an executed application, the smartphone 1 displays the home screen 40 on the display 2A.

At Step S161, the wallpaper 41 of the home screen 40 is touched by the user's finger F. In this case, the smartphone 1 detects a touch in the area where the wallpaper 41 is displayed. Thereafter, the user flicks the finger F touching the wallpaper 41 in a direction indicated by arrow α1, i.e., the leftward direction on the screen at Step S161. In this case, the smartphone 1 detects a flick that starts from the wallpaper 41 and whose contact position moves in the arrow α1 direction.

When detecting the flick gesture performed for the home screen 40 in the arrow α1 direction as illustrated at Step S161, the smartphone 1 displays a home screen on the right side of the home screen 40 displayed at Step S161 on the touch screen display 2 as illustrated at Step S162. That is, the smartphone 1 changes the home screen 40 to be displayed according to the flick direction. In the present embodiment, the flick is performed for the wallpaper 41; however, the same process is executed even when the flick is performed for the area where an icon 50 is displayed.

At Step S171 illustrated in FIG. 14, the home screen 40 is displayed on the display 2A similarly to Step S161. At Step S171, the wallpaper 41 of the home screen 40 is touched by the user's finger F. In this case, the smartphone 1 detects the touch in the area where the wallpaper 41 is displayed. Thereafter, the user flicks the finger F touching the wallpaper 41 in a direction indicated by arrow α2, i.e., the upward direction on the screen at Step S171. In this case, the smartphone 1 detects a flick that starts from the wallpaper 41 and whose contact position moves in the arrow α2 direction. In the present embodiment, the flick is performed for the wallpaper 41; however, the same process is executed even when the flick is performed for the area where the icons 50 are displayed.

When detecting the flick gesture performed for the home screen 40 in the arrow α2 direction as illustrated at Step S171, the smartphone 1 displays an activated-icon display screen 90 on the touch screen display 2 as illustrated at Step S172. The activated-icon display screen 90 displays activated icons 92. The activated icon 92 is an icon identical to the activated icon 66 on the lock screen 60. The activated-icon display screen 90 according to the present embodiment has eight activated icons 92 arranged thereon. In other words, illustrated is the activated-icon display screen 90 in the case where eight functions are activated.

The smartphone 1 displays the activated-icon display screen 90 as illustrated in FIG. 14, and this allows the activated icons to be displayed in the form of a list, which enables the user to easily and instantly check the activated functions. As illustrated in FIG. 13 and FIG. 14, the smartphone 1 respectively executes the change of the home screen 40 and the display of the activated-icon display screen 90 depending upon the direction of the flick gesture. Thus, the activated-icon display screen 90 can be displayed by a user's simple operation.

Next, a procedure executed by the smartphone 1 during the display of the home screen 40 will be explained below with reference to FIG. 15. FIG. 15 is a flowchart illustrating a procedure for the control executed during the display of the home screen. The controller 10 may execute other procedure in parallel to the procedure illustrated in FIG. 15.

At Step S201, the controller 10 of the smartphone 1 determines whether a flick gesture has been performed for the home screen 40. When it is determined that a flick gesture has not been performed for the home screen 40 (No at Step S201), the controller 10 proceeds to Step S201. In this way, the controller 10 repeats the process at Step S201 until a flick gesture performed for the home screen 40 is detected at Step S201.

When it is determined that a flick gesture has been performed for the home screen 40 at Step S201 (Yes at Step S201), then at Step S202, the controller 10 determines whether the flick gesture performed for the home screen 40 is a flick gesture in the first direction. The flick gesture in the first direction is, for example, a flick gesture in a rightward direction or in a leftward direction.

When it is determined that the flick gesture performed for the home screen 40 is the one in the first direction at Step S202 (Yes at Step S202), then at Step S203, the controller 10 changes the home screen. The controller 10 then ends the series of processes.

When it is determined that a flick gesture performed for the home screen 40 is not the one in the first direction at Step S202 (No at Step S202), then at Step S204, the controller 10 determines whether the flick gesture performed for the home screen 40 is the one in the second direction. The flick gesture in the second direction is, for example, a flick gesture in an upward direction or in a downward direction.

When it is determined that the flick gesture performed for the home screen 40 is the one in the second direction at Step S204 (Yes at Step S204), then at Step S205, the controller 10 changes the home screen to the activated-icon display screen. The controller 10 then ends the series of processes.

When it is determined that the flick gesture performed for the home screen 40 is not the one in the second direction at Step S204 (No at Step S204), then at Step S206, the controller 10 performs an operation according to a flick gesture on the home screen. The controller 10 then ends the series of processes.

The embodiment disclosed in the present application can be modified without departing the gist and the scope of the invention. Moreover, the embodiments and their modifications disclosed in the present application can be combined with each other if necessary. For example, the embodiment may be modified as follows.

For example, the programs illustrated in FIG. 5 may be divided into a plurality of modules, or may be combined with any other program.

The smartphone 1 may display a trash box on the lock screen 60 and the activated-icon display screen 90, and may deactivate the function associated with an activated icon 66 or 92 when the activated icon 66 or 92 is dropped into the trash box. The smartphone 1 may display an icon for execution, and may execute the function corresponding to an activated icon 66 or 92 when the icon for execution is dropped on the activated icon 66 or 92 or the activated icon 66 or 92 is dropped on the icon for execution.

In the embodiment, the smartphone has been explained as an example of the device provided with the touch screen; however, the device according to the appended claims is not limited to the smartphone. The device according to the appended claims may be a mobile electronic device other than the smartphone. Examples of the mobile electronic devices include, but are not limited to, mobile phones, tablets, mobile personal computers, digital cameras, media players, electronic book readers, navigators, and gaming devices. The device according to the appended claims may be a stationary-type electronic device. Examples of the stationary-type electronic devices include, but are not limited to, desktop personal computers, automatic teller machines (ATM), and television receivers.

Although the art of appended claims has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A device, comprising:
    a touch screen display configured to display a lock screen in a locked state and a home screen in a unlocked state, the lock screen being different from the home screen; and
    a controller configured to cause the touch screen display to display, on the lock screen,
    a plurality of activated icons each corresponding to an activated function among a plurality of activated functions, and
    a plurality of deactivated icons each corresponding to a deactivated function among a plurality of deactivated functions,
    wherein
    the lock screen is a screen in which any gesture other than a preset gesture is prevented from unlocking the device,
    in response to the preset gesture on the lock screen, the controller is configured to cause the touch screen display to display the home screen, during display of the lock screen, the controller is configured to switch, upon detection of a specific gesture on the lock screen in an area outside all of the activated icons, between displaying and hiding of the activated icons in such a manner that
    when the activated icons are not being displayed and upon detection of the specific gesture on the lock screen, the controller is configured to cause the touch screen display to display all of the activated icons and all of the deactivated icons on the lock screen, and
    when the activated icons are being displayed and upon detection of the specific gesture on the lock screen in the area outside all of the activated icons, the controller is configured to cause the touch screen display to hide all of the activated icons from the lock screen, without stopping the activated functions corresponding to the activated icons, and
    to keep displaying all of the deactivated icons on the lock screen after hiding all of the activated icons from the lock screen.

2. The device according to claim 1, wherein
    the controller is configured to display, upon detecting a first gesture on one of the activated icons through the touch screen display, a screen of the activated function corresponding to the activated icon on which the first gesture is performed,
    the controller is configured to deactivate, upon detecting a second gesture on the activated icon through the touch screen display, the function corresponding to the activated icon on which the second gesture is performed, and
    the specific gesture, the first gesture and the second gesture are different from each other.

3. The device according to claim 1, wherein
    the specific gesture is a long touch or a long tap detected through the touch screen display.

4. The device according to claim 1, wherein
    the controller is configured to cause, when activating the lock screen, the activated icons not to be displayed on the lock screen.

5. The device according to claim 1, wherein
    the controller is configured to display, upon detecting a first gesture on one of the activated icons through the touch screen display, a screen of the activated function corresponding to the activated icon on which the first gesture is performed.

6. The device according to claim 1, wherein
    the controller is configured to deactivate, upon detecting a second gesture on one of the activated icons through the touch screen display, the function corresponding to the activated icon on which the second gesture is performed.

7. The device according to claim 1, wherein the controller is configured to
    cause the touch screen display to display the activated icons at corresponding display positions on the touch screen display, and
    move, upon detecting a first gesture for one of the activated icons at a contact position on the touch screen display, the display position of the activated icon according to a movement of the contact position of the first gesture.

8. The device according to claim 1, wherein
    during display of the home screen and in response to a gesture on the displayed home screen, the controller is configured to cause the touch screen display to display
    another home screen when the gesture is in a first direction, and
    an activated-icon display screen with all the activated icons when the gesture is in a second direction different from the first direction.

* * * * *